United States Patent [19]

Boots

[11] Patent Number: 4,650,244
[45] Date of Patent: Mar. 17, 1987

[54] SLIDING ROOF FOR A VEHICLE

[75] Inventor: Robert T. Boots, Haarlem, Netherlands

[73] Assignee: Vermeulen-Hollandia Octrooien II B.V., Haarlem, Netherlands

[21] Appl. No.: 747,061

[22] Filed: Jun. 20, 1985

[30] Foreign Application Priority Data

Mar. 20, 1985 [NL] Netherlands .................. 8500808

[51] Int. Cl.$^4$ .................. B60J 7/057; B60J 7/05; B60J 7/185
[52] U.S. Cl. .................. 296/223; 296/214; 296/216; 296/221; 296/224; 292/DIG. 4; 292/DIG. 5
[58] Field of Search .............. 296/216, 221, 222, 224, 296/223, 214; 292/DIG. 5, DIG. 4

[56] References Cited

U.S. PATENT DOCUMENTS

| 3,789,645 | 2/1974 | Schmid | 296/223 |
| 4,422,687 | 12/1983 | Kaltz et al. | 296/222 |

FOREIGN PATENT DOCUMENTS

| 1231579 | 12/1966 | Fed. Rep. of Germany | 296/223 |
| 3338372 | 4/1984 | Fed. Rep. of Germany | 296/216 |

Primary Examiner—Robert B. Reeves
Assistant Examiner—Dennis H. Pedder
Attorney, Agent, or Firm—Pahl, Lorusso & Loud

[57] ABSTRACT

A sliding roof for a vehicle with a roof opening, comprising a transparent outer panel and an inner panel with a grip. The outer panel may be moved downwardly from its closed position in the roof opening and may be slid backwardly between the fixed roof and the inner roof lining of the vehicle to a wholly or partly opened position and back. Upon opening of the outer panel a carrier means on the outer panel slides the inner panel backwardly and in the wholly opened position of the outer panel the inner panel substantially entirely lies between the inner roof lining and the fixed roof and a hand grip of the inner panel is inaccessible. Upon the forward movement of the outer panel from its substantially rearward wholly opened position, a locking mechanism locks the inner panel in a position in which the handgrip remains inaccessible. In this position the locking mechanism may be uncoupled from a spring loaded displacement mechanism, whereafter the displacement mechanism moves the inner panel automatically to an intermediate position in which the grip of the inner panel can be gripped by hand.

12 Claims, 10 Drawing Figures

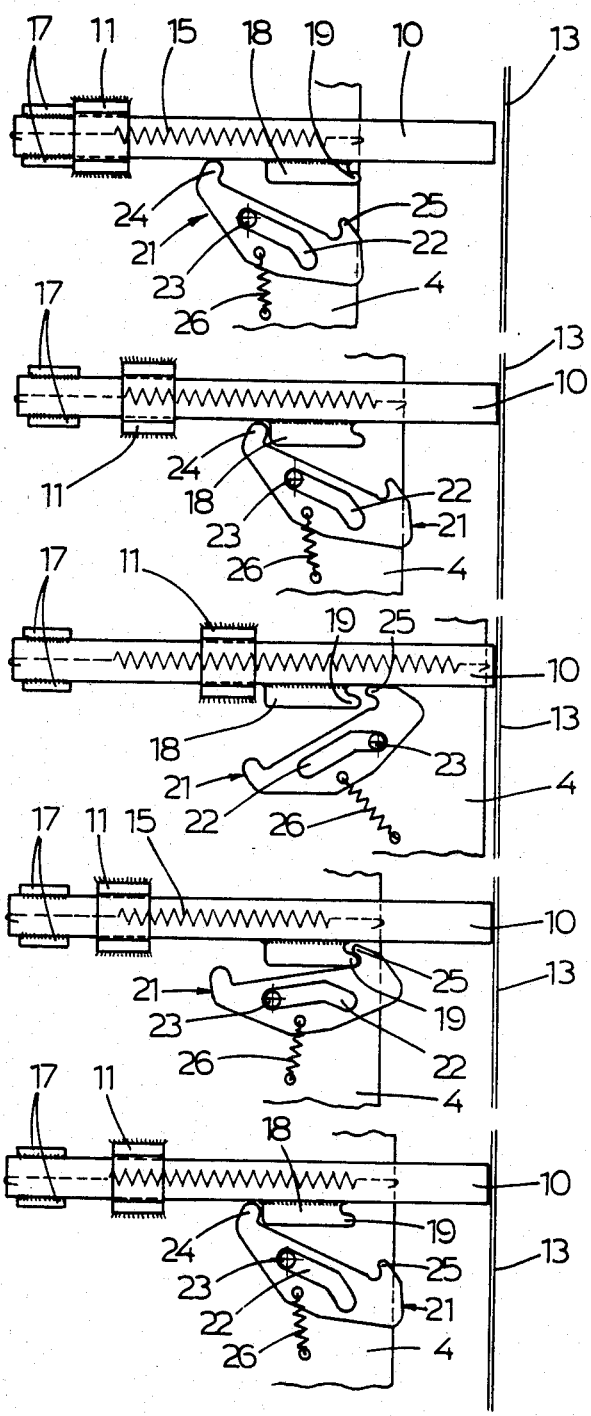

SLIDING ROOF FOR A VEHICLE

The invention relates to a sliding roof for a vehicle with a roof opening, comprising an inner panel with a grip and a transparent outer panel, which may be moved downwardly from its closed position in the roof opening and may be slid backwardly between the fixed roof and the inner roof of the vehicle to a wholly or partly opened position and back, whilst upon opening of the outer panel a carrier means on the outer panel slides the inner panel backwardly and in the wholly opened position of the outer panel the inner panel substantially entirely lies between the inner roof and the fixed roof.

In a known embodiment of a sliding roof of this kind the outer panel is provided with a second carrier means, which automatically takes the inner panel to an intermediate position when the outer panel is slid forwardly from the wholly opened position to the closed position, in which intermediate position the grip of the inner panel can be gripped.

However, this known sliding roof has the disadvantage that the second carrier means only slides the inner panel to the intermediate position when the outer panel has almost reached its foremost position. In order to make the grip of the inner panel accessible, the outer panel will always have to be moved into the almost closed position, also when only a partly closed position of the inner panel and of the outer panel is desired.

A further disadvantage of this known sliding roof is that when the outer panel is in its closed position the inner panel always projects out of the inner roof.

It is an object of the present invention to provide a sliding roof for a vehicle of the type mentioned above, with which the aforementioned disadvantages are removed in an efficient way.

For this purpose the sliding roof according to the invention is characterized in that upon the forward movement of the outer panel from its substantially rearward wholly opened position, a locking mechanism locks the inner panel in a position, in which the inner panel still substantially entirely lies between the fixed roof and the inner roof, and wherein the locking mechanism may be uncoupled, whereafter a displacement mechanism moves the inner panel automatically to an intermediate position, in which the grip of the inner panel can be gripped by hand.

In this way the grip of the inner panel can be made accessible in every wholly or partly closed position of the outer panel, and in the closed position of the outer panel the inner panel can lie entirely above the inner roof if desired and does not project into the roof opening.

The invention will be elucidated hereinafter with reference to the drawings, which schematically show an embodiment by way of example of the sliding roof according to the invention.

FIGS. 3a, 3b, 3c, 3d and 3e show on a larger scale schematic top views of a portion of the sliding roof of FIG. 1, wherein the locking mechanism and the displacement mechanism of the inner panel are illustrated in various positions.

The drawings represent by way of example an embodiment of a sliding roof for a vehicle, which is provided with an opening 1 in the fixed roof 2.

This sliding roof comprises an outer panel 3 and an inner panel 4. In general, the outer panel 3 is made of a transparent material, such as glass, whilst the inner panel 4 is formed as a non-transparent sunshade.

Figure 1:
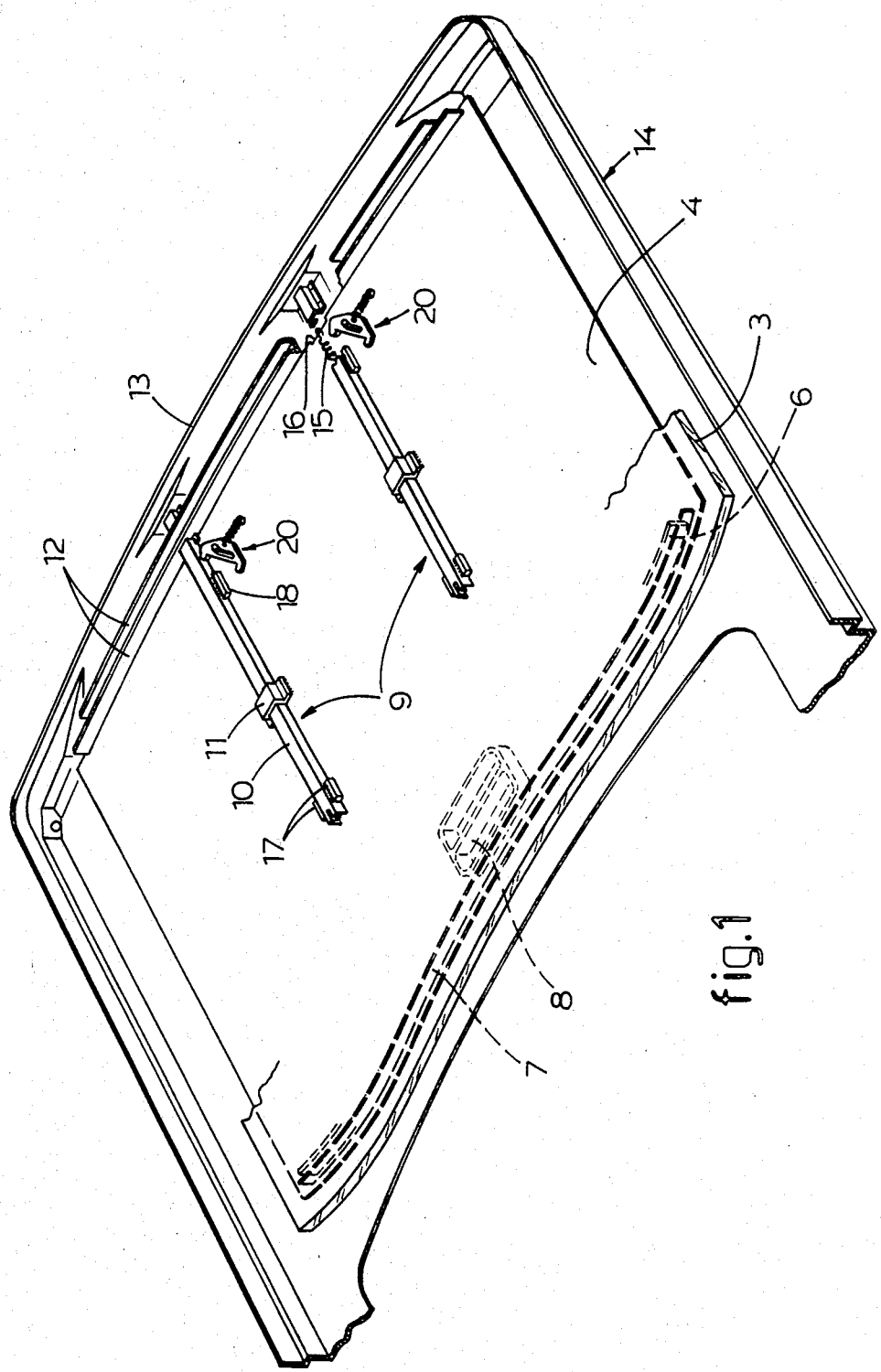
FIG. 1 is a schematic perspective view of a portion of the sliding roof according to the invention.
Figure 2A:
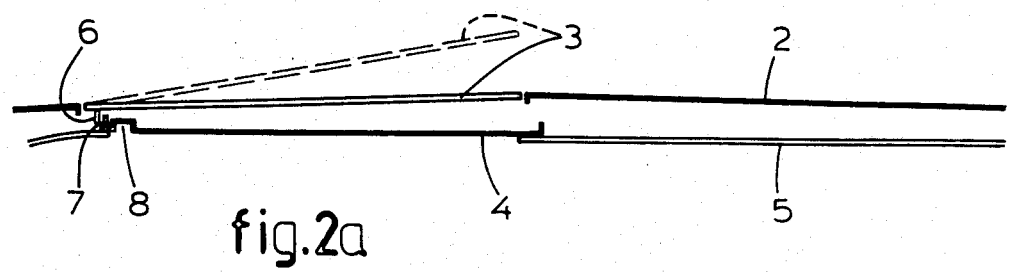
FIGS. 2a, 2b, 2c and 2d show schematic sectional views of the sliding roof of FIG. 1, in various positions.

In FIG. 2a the outer panel 3 as well as the inner panel 4 are shown in the closed position.

The outer panel 3 can be moved from this closed position into a rearwardly and upwardly inclined ventilating position (see position in dotted lines in FIG. 2a) and can be moved back from this ventilating position to the closed position.

In the ventilating position of the outer panel 3 generally the inner panel 4 will be moved backwardly from the closed position. If desired the inner panel 4 may be provided with louvres, in which case it is not necessary that in the ventilating position of the outer panel 3 the inner panel 4 is in a backwardly moved position.

Furthermore, the outer panel 3 can be moved downwardly from its closed position in the roof position 1, whereupon the outer panel 3 together with the inner panel 4 can be slid backwardly between the fixed roof 2 and the inner roof 5 of the vehicle to a wholly or partly opened position. For moving the inner panel 4 backwardly the outer panel 3 comprises a carrier means 6, which in the embodiment shown consists of an edge, which is mounted at the front side underneath the outer panel 3 and which can engage a transverse upright edge 7 provided near the front side of the inner panel 4. In the position in which the carrier means 6 engages the upright edge 7, it is not possible to slide the inner panel 4 further forwardly with respect to the outer panel 3.

Figure 2B:
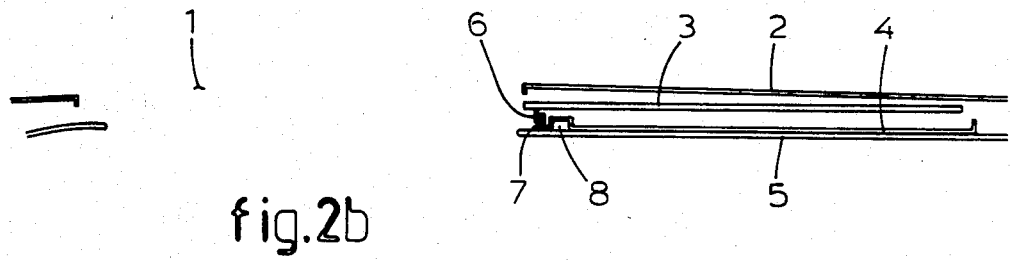

FIG. 2b shows the sliding roof in its wholly opened position, in which the outer panel 3 as well as the inner panel 4 are received entirely between the fixed roof 2 and the inner roof 5 of the vehicle and the roof opening 1 therefore is left completely clear.

From this wholly opened position the outer panel 3 may be moved forwardly again into the closed position.

Figure 2C:
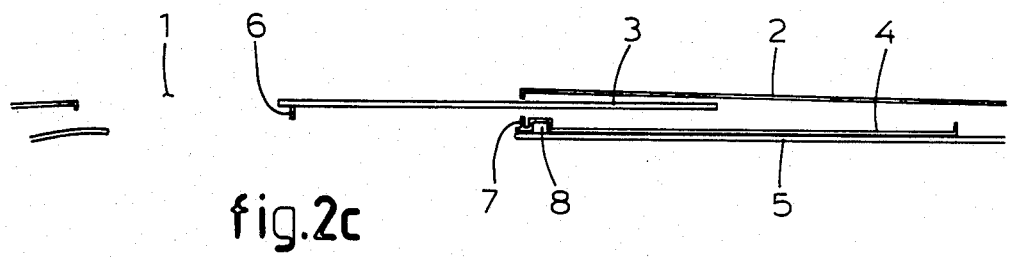

In a way to be more particularly described hereinafter, the inner panel 4 hereby remains locked in a position, in which the front side of the inner panel 4 still lies above the inner roof 5 (FIG. 2c).

In a way also to be described hereinafter, in FIG. 2d the inner panel 4 is moved forwardly independently of the movement of the outer panel 3 over such a distance that a grip 8 formed on the inner panel 4 can be gripped by hand.

The operation of the outer panel 3 takes place in a manner known per se and will not be elucidated further.

Figure 2D:
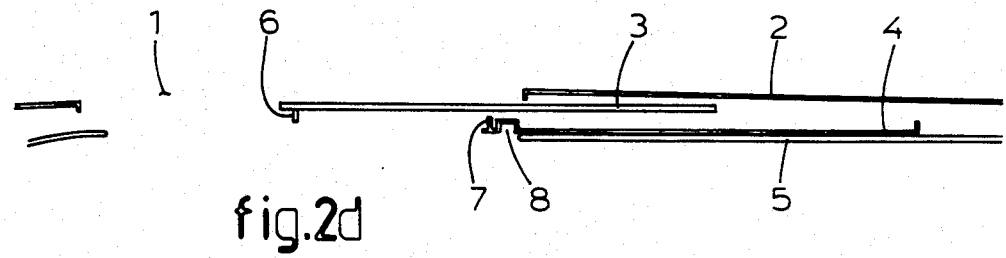

For the adjustment of the inner panel 4 from the position of FIG. 2c to the position of FIG. 2d a displacement mechanism 9 is provided on the inner panel 4.

In the embodiment shown in the drawing by way of example this displacement mechanism 9 comprises two U-sections 10, which are symmetrically positioned with respect to the central longitudinal axis of the sliding roof and which are slidable in the longitudinal direction of the sliding roof with respect to the inner panel 4, the legs of these U-sections 10 extending downwardly from the web part. Each U-section 10 is guided through a bracket 11 mounted on the inner panel 4. At the rear side of the inner panel 4 two transversely extending upright edges 12 are formed, which upright edges are provided with openings for passing the U-sections 10, so that the U-sections thereby project rearwardly from the inner roof 4 and can come into engagement with a rear edge 13 of a stationary sliding roof frame 14.

A tension spring 15 extending between the legs of each U-section 10, engages with its one end the front edge of the U-section 10 and engages with its other end in a notch 16 near the rear side of the inner panel 4.

Each tension spring 15 exerts a backwardly directed force on the respective U-section 10 with respect to the inner panel 4 and in the rest position of the displacement mechanism 9 each tension spring 15 holds a stop 17 formed on this U-section 10 in engagement with the bracket 11, which bracket thus serves as a counterstop.

On one longitudinal side of each U-section 10 a protrusion 18 is provided, the rear side of which is formed as a hook 19. The protrusions 18 can co-operate with a respective locking mechanism 20, comprising two tilting cams 21, each tilting cam by means of a V-shaped guide slot 22 being slidably and pivotably guided along a pin 23 in a plane parallel to the inner panel 4, which is mounted on the inner panel 4. For the co-operation with the protrusion 18 of the respective U-section 10 each tilting cam 21 has at its front side a nose 24, which is directed to the U-section 10, whilst near this rear side of each tilting cam 21 a hook 25 is formed, which can come into engagement with the hook 19 of the protrusion 18.

On the longitudinal side of each tilting cam 21, which faces away from the respective U-section 10, a tension spring 26 engages the tilting cam 21 approximately at the centre of the guide slot 22, which tension spring 26 is connected with its other end to the inner panel 4.

The operation of the displacement mechanism 9 and the locking mechanism 20 for the inner panel 4 will be described hereinafter.

Because the displacement mechanism 9 and the locking mechanism 20 both consist of two sub-mechanisms functioning in the same way, the operation of only one sub-mechanism will be elucidated more particularly.

Upon the backward movement of the outer panel 3 to a wholly or partly opened position the carrier means 6 of the outer panel 3 takes the inner panel 4 along through the upright edge 7, when the inner panel 4 is in its foremost position.

In the position of FIG. 3a the rear end of the U-section 10 almost comes into engagement with the rear edge 13 of the stationary sliding roof frame 14. In this position the grip 8 of the inner panel 4 lies just in front of the inner roof 5 and can therefore still be gripped by hand.

Upon a further backward movement of the outer panel 3 and therefore of the inner panel 4 the U-section 10 comes into engagement with the rear edge 13 of the stationary sliding roof frame 14 and remains in this position with respect thereto. The inner panel 4 then moves further backwardly with respect to the U-section 10, while the bracket 11 of the inner panel 4, serving as counterstop, moves away from the stop 17 of the U-section 10, while in the position of FIG. 3b the nose 24 of the tilting cam 21 has just come into contact with the protrusion 18 of the U-section 10.

For the present the tension spring 26 engages the tilting cam 21 with respect to the pin 23 in such a way that this tension spring 26 holds the nose 24 of the tilting cam 21 in contact with the front side of the protrusion 18 on the U-section 10.

Hereafter the tilting cam 21 can no longer follow the backward movement of the inner panel 4, because the nose 24 of the tilting cam 21 is locked in the longitudinal direction by the protrusion 18.

As a result thereof the pin 23 of the inner panel 4 will pass through the guide slot 22 of the tilting cam 21 in the backward direction, while the tilting cam 21 will slightly rotate around the pin 23, in consequence of the inclined position of the longer part of the V-shaped guide slot 22 with respect to the direction of movement of the pin 23.

When the pin 23 has passed through the guide slot 22 to such an extent that this pin 23 has passed the extension of the tension spring 26, the rotational direction of the torque on the tilting cam 21 generated by the tension spring 26 will then reverse, so that the nose 24 is moved away from the U-section 10, while the hook 25 of the tilting cam 21 is brought into contact with the U-section 10, as is shown in FIG. 3c.

In FIG. 3c the pin has reached the rear end of the guide slot 22 and the outer panel 3 as well as the inner panel 4 are in their backward position. The forward force exerted by the tension spring 15 of the U-section 10 on the inner panel 4 is led to the fixed roof 2 through the outer panel 3.

When the outer panel 3 is slid forwardly again from its maximum backwardly moved and therefore wholly opened position, the force exerted by the tension spring 15 on the inner panel 4 will hold the upright edge 7 of the inner panel 4 in contact with the carrier means 6 of the outer panel 3 and as a consequence the inner panel 4 will follow the forward movement of the outer panel 3 for the present. The pin 23 and the lifting cam 21 thereby move forwardly with the inner panel 4, until the hook 25 of the tilting cam 21 comes into engagement with the hook 19 of the protrusion 18 on the U-section 10, whereby the tilting cam 21 is locked in the forward direction with respect to the U-section 10.

In this case, when the outer panel 3 is moved further forwardly the force of the tension spring 15 will cause the pin 23 of the inner panel 4 to pass through the guide slot 22 in the tilting cam 21, while the inclined position of the guide slot 22 causes the tilting cam 21 to tilt slightly. While the pin 23 passes through the guide slot 22, this pin 23 again passes the extension of the tension spring 26 and the rotational direction of the torque on the tilting cam 21 reverses. The engagement between the hooks 19 and 25 of the tilting cam 21 and of the U-section 10, respectively prevents, however, a further tilting of the tilting cam 21. When the pin 23 has fully passed the guide slot 22 in the tilting cam 21, as is shown in FIG. 3d the inner panel 4 no longer follows the movement of the outer panel 3, because the inner panel 4 is locked in the forward direction with respect to the U-section 10. In this position the inner panel 4 still lies entirely above the inner roof 5.

In order to eliminate the locking of the tilting cam 21, the inner panel 4 has to be moved backwardly by hand over a small distance. This can be done by pushing with the fingers against the front side of the inner panel 4 between the fixed roof 2 and the inner roof 5. Upon this backward movement of the inner panel 4 the pin 23 on the inner panel 4 takes the tilting cam 21 along, so that the contact between the hook 25 of the tilting cam 21 and the hook 19 of the U-section 10 is disengaged.

Because of the position of the point of engagement of the tension spring 26 on the tilting cam 21 with respect to the pin 23, the tension spring 26 exerts such a torque on the tilting cam 21 that the tilting cam 21 tilts around the pin 23 and the hook 25 moves away from the U-section 10 (FIG. 3e).

When the inner panel 4 is released, the spring 15 causes this inner panel 4 to be pushed forwardly into a position in which the stop 17 of the U-section 10 engages the bracket 11 on the inner panel 4. In this position the inner panel 4 projects beyond the inner roof 5 to such an extent that the grip 8 can be gripped by hand and therefore the inner panel 4 can be slid further forwardly by hand into the position in which the upright edge 7 comes into engagement with the carrier means 6 of the outer panel.

The invention is not limited to the embodiment shown in the drawing by way of example which may be varied in several ways within the scope of the invention.

I claim:

1. A sliding roof for a vehicle having a fixed roof and an inner roof both provided with a roof opening, comprising:
    a transparent outer panel for closing the roof opening of the fixed roof in its closed position, the outer panel being movable downwardly from said closed position and being slidable backwardly between the fixed roof and the inner roof of the vehicle to a wholly or partly opened position and vice versa,
    an inner panel provided with a grip, the inner panel being movable backwardly and forwardly;
    a carrier means mounted to the outer panel and adapted to engage the inner panel such that upon opening of the outer panel the carrier means simultaneously slides the inner panel backwardly and in the wholly opened position of the outer panel the inner panel lies between the inner roof and the fixed roof, and the grip is substantially concealed by the inner roof,
    a displacement mechanism and a locking mechanism, cooperating such that upon the forward movement of the outer panel from its rearward wholly opened position, the inner panel grip remains concealed, the displacement mechanism and locking mechanism are coupled and the displacement mechanism stores energy, and wherein uncoupling of the displacement mechanism and locking mechanism results in release of the stored energy to move the inner panel to an intermediate position in which the grip can be gripped by hand.

2. A sliding roof as claimed in claim 1, wherein the locking mechanism is connected to the inner panel.

3. A sliding roof as claimed in claim 2, wherein the locking mechanism may be uncoupled by hand.

4. A sliding roof as claimed in claim 3, wherein the locking mechanism comprises at least one tilting cam, which tilting cam can lock the displacement mechanism with respect to the inner panel when it is in its locking position, in which it is tilted to one side, and which tilting cam releases the displacement mechanism when it is in its position in which it is tilted to the other side.

5. A sliding roof as claimed in claim 4, wherein said at least one tilting cam is provided with a guide slot, with which this tilting cam around a pin mounted on the inner panel is slidably and rotatably guided in a plane parallel to the inner panel, and an actuating spring engages the tilting cam to exert a torque on the tilting cam around the pin, the direction of the torque depending upon the position of the pin in the guide slot.

6. A sliding roof as claimed in claim 5, wherein the guide slot has a V-shaped configuration.

7. A sliding roof as claimed in claim 1, wherein the displacement mechanism comprises at least one spring for displacing the inner panel from the rearward position to the intermediate position.

8. A sliding roof as claimed in claim 7, wherein said at least one spring on one side engages the inner panel and on the other side engages said displacement mechanism, which is disposed on the inner panel so as to be movable in the longitudinal direction, and which may come into contact with a stationary part of the sliding roof, while the spring urges the inner panel in a forward direction.

9. A sliding roof as claimed in claim 8, wherein said displacement mechanism comprises two elongated sections, each of which extends beyond the rear side of the inner panel and may engage a rear edge of a stationary sliding roof frame.

10. A sliding roof as claimed in claim 9, wherein each section is guided by a bracket mounted on the inner panel and serving as a counterstop for a stop formed on the section, so as to define an end position of the displacement mechanism.

11. A sliding roof as claimed in claim 10, wherein each section has a protrusion, adapted to bring the tilting cam into its locking position tilted to one side, when the inner panel is moved backwardly with respect to the section, in which position a hook of the protrusion may engage a hook formed on the tilting cam.

12. A sliding roof as claimed in claim 11, wherein said at least one tilting cam is provided with a front nose, which can co-operate with a front surface of the protrusion.

* * * * *